(12) United States Patent
Zhang (10) Patent No.: US 11,996,700 B2
(45) Date of Patent: May 28, 2024

(54) WIRELESS CHARGING CONTROL METHOD, CIRCUIT AND TERMINAL DEVICE

(71) Applicant: VIVO MOBILE COMMUNICATION CO., LTD., Guangdong (CN)

(72) Inventor: Jun Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 420 days.

(21) Appl. No.: 17/357,273

(22) Filed: Jun. 24, 2021

(65) Prior Publication Data

US 2021/0320526 A1    Oct. 14, 2021

Related U.S. Application Data

(63) Continuation of application No. PCT/CN2019/126191, filed on Dec. 18, 2019.

(30) Foreign Application Priority Data

Dec. 28, 2018    (CN) .......................... 201811621293.X (51) Int. Cl.
*H02J 7/02*        (2016.01)
*H02J 50/10*     (2016.01)
*H02M 7/219*   (2006.01)

(52) U.S. Cl.
CPC ............. *H02J 50/10* (2016.02); *H02J 7/02* (2013.01); *H02M 7/219* (2013.01)

(58) Field of Classification Search
CPC .. H02J 50/10; H02J 7/02; H02J 50/005; H02J 2207/20; H02J 7/025; H02M 7/219; H02M 5/12
See application file for complete search history.

(56) References Cited

U.S. PATENT DOCUMENTS 10,261,491 B1 *  4/2019  Dunham ............... G05B 19/298
11,611,237 B2 *  3/2023  Chen ........................ H02J 50/10
(Continued)

FOREIGN PATENT DOCUMENTS

CN    105826066 A    8/2016
CN    106300520 A    1/2017
(Continued)

OTHER PUBLICATIONS

Supplementary European Search Report regarding Patent Application No. 19902775.6-1202/3905474; PCT/CN2019/126191, dated Jan. 21, 2022.

(Continued)

*Primary Examiner* — Nghia M Doan (74) *Attorney, Agent, or Firm* — Harness, Dickey & Pierce, P.L.C.

(57) ABSTRACT

A wireless charging control method applied to a wireless charging control circuit in a terminal device, and the wireless charging control circuit includes a wireless charging receiving coil, the wireless charging receiving coil has at least two operating states, and inductance values of the wireless charging receiving coil in the operating states are different from each other. The method includes: obtaining an induced voltage of the wireless charging receiving coil; and controlling, based on the induced voltage, the wireless charging receiving coil to operate in a corresponding operating state.

15 Claims, 3 Drawing Sheets

(56) References Cited

U.S. PATENT DOCUMENTS

| | | | |
|---|---|---|---|
| 2005/0017677 | A1 | 1/2005 | Burton et al. |
| 2020/0014252 | A1 | 1/2020 | Wan et al. |
| 2020/0280216 | A1* | 9/2020 | Pei .................... H02J 7/007182 |
| 2021/0135494 | A1 | 5/2021 | Zhang |

FOREIGN PATENT DOCUMENTS

| | | |
|---|---|---|
| CN | 106451705 A | 2/2017 |
| CN | 108053988 A | 5/2018 |
| CN | 108923545 A | 11/2018 |
| CN | 109546711 A | 3/2019 |
| JP | 2016134965 A | 7/2016 |
| WO | WO-2018184573 A1 | 10/2018 |

OTHER PUBLICATIONS

International Search Report and Written Opinion of the International Searching Authority regarding International Patent Application No. PCT/CN2019/126191, dated Mar. 25, 2020. Translation provided by Bohui Intellectual Property.

First Office Action regarding Chinese Patent Application No. 201811621293.X, dated Mar. 23, 2020. Translation provided by Bohui Intellectual Property.

Second Office Action regarding Chinese Patent Application No. 201811621293.X, dated Nov. 20, 2020. Translation provided by Bohui Intellectual Property.

Third Office Action regarding Chinese Patent Application No. 201811621293.X, dated Jun. 8, 2021. Translation provided by Bohui Intellectual Property.

\* cited by examiner

WIRELESS CHARGING CONTROL METHOD, CIRCUIT AND TERMINAL DEVICE

CROSS-REFERENCE TO RELATED APPLICATIONS

This application is a Bypass Continuation Application of PCT/CN2019/126191 filed on Dec. 18, 2019, which claims priority to Chinese Patent Application No. 201811621293.X, filed on Dec. 28, 2018, which are incorporated herein by reference in their entirety.

TECHNICAL FIELD

Embodiments of the present disclosure relate to the field of wireless charging technologies, and in particular, to a wireless charging control method, a circuit and a terminal device.

BACKGROUND

With rapid development of wireless charging technologies, wireless charging functions are more and more commonly used in terminal devices (for example, a mobile phone and a tablet computer), and a terminal device with a wireless charging function is favored by many users.

SUMMARY

According to a first aspect, an embodiment of the present disclosure provides a wireless charging control method, applied to a wireless charging control circuit in a terminal device, where the wireless charging control circuit includes a wireless charging receive coil, the wireless charging receive coil has at least two operating states, and inductance values of the wireless charging receive coil in the operating states are different from each other; and
  the wireless charging control method includes:
    obtaining an induced voltage of the wireless charging receive coil; and
    controlling, based on the induced voltage, the wireless charging receive coil to operate in a corresponding operating state.
  According to a second aspect, an embodiment of the present disclosure provides a wireless charging control circuit, applied to a terminal device, where the wireless charging control circuit includes:
    a wireless charging receive coil, where the wireless charging receive coil has at least two operating states, and inductance values of the wireless charging receive coil in the operating states are different from each other; and
    a control module, where the control module is electrically connected to the wireless charging receive coil, and the control module is configured to: obtain an induced voltage of the wireless charging receive coil, and control, based on the induced voltage, the wireless charging receive coil to operate in a corresponding operating state.
  According to a third aspect, an embodiment of the present disclosure provides a terminal device, including a processor, a memory, and a computer program that is stored in the memory and executable on the processor, where when the processor executes the computer program, steps of the wireless charging control method are implemented.

According to a fourth aspect, an embodiment of the present disclosure provides a terminal device, including the foregoing wireless charging control circuit.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.
  In the related technologies, when the wireless charging function is used, a charging state of the terminal device is usually fixed. In this way, wireless charging performance of the terminal device is relatively poor, and a user requirement cannot be well met.
  The following first describes a wireless charging control method provided in the embodiments of the present disclosure.
  It should be noted that the wireless charging control method provided in the embodiments of the present disclosure is applied to a wireless charging control circuit in a terminal device, where the wireless charging control circuit includes a wireless charging receive coil, the wireless charging receive coil has at least two operating states, and inductance values of the wireless charging receive coil in the operating states are different from each other.
  The wireless charging receive coil may have two operating states; or the wireless charging receive coil may have at least two operating states, for example, three, four, or five operating states.
  To ensure that the wireless charging receive coil has different inductance values in different operating states, the wireless charging receive coil may access the wireless charging control circuit by using different quantities of coil turns in different operating states. A larger quantity of coil turns for the wireless charging receive coil to access the wireless charging control circuit indicates a larger inductance value of the wireless charging receive coil, and a smaller quantity of coil turns for the wireless charging receive coil to access the wireless charging control circuit indicates a smaller inductance value of the wireless charging receive coil.

Figure 1:
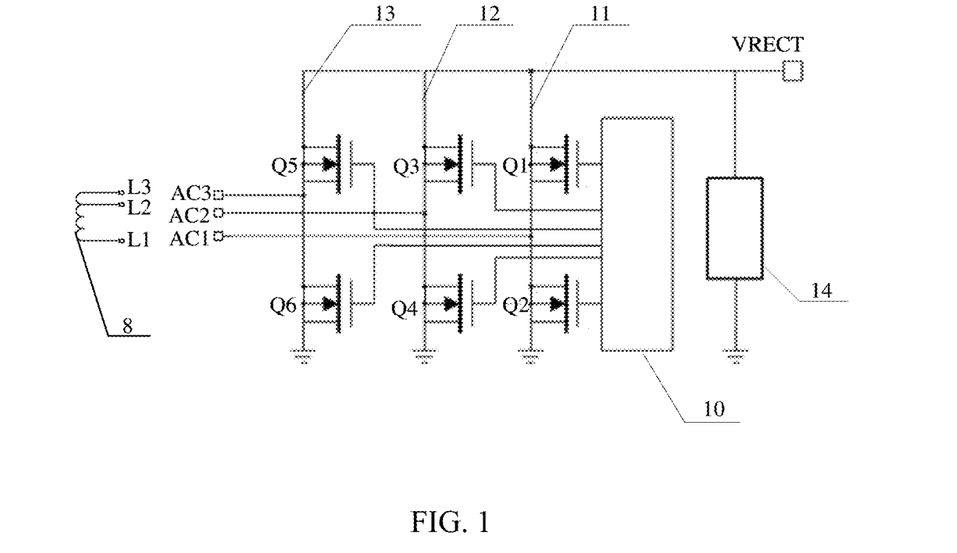
FIG. 1 is a schematic structural diagram of a wireless charging control circuit according to an embodiment of the present disclosure.

It should be noted that the wireless charging control circuit may further include a control module 10 shown in FIG. 1. The wireless charging control method provided in the embodiments of the present disclosure may be applied to the control module 10. Optionally, the control module 10 may be a synchronous rectifier control module (synchronous rectifier control module).

In addition, types of terminal devices are various. For example, the terminal device may be a computer, a mobile phone, a tablet computer (tablet personal computer), a laptop computer, a personal digital assistant (PDA), a mobile internet device (MID), or a wearable device.

Figure 2:
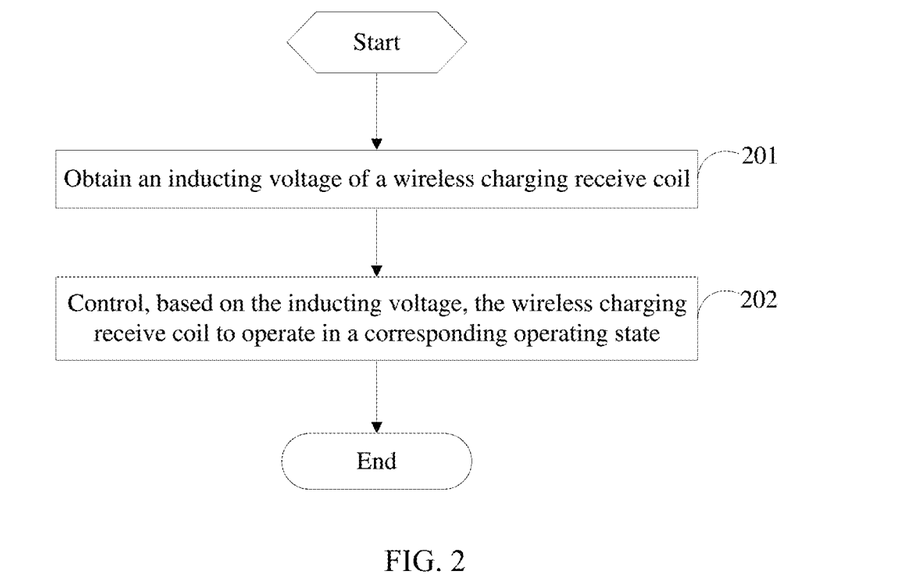
FIG. 2 is a flowchart of a wireless charging control method according to an embodiment of the present disclosure.

FIG. 2 is a flowchart of a wireless charging control method according to an embodiment of the present disclosure. As shown in FIG. 2, the wireless charging control method includes the following steps.

Step 201: Obtain an induced voltage of a wireless charging receive coil.

A wireless charging control circuit may further include an analog-to-digital converter (ADC), and the induced voltage of the wireless charging receive coil may be obtained through sampling by the ADC.

Figure 3:
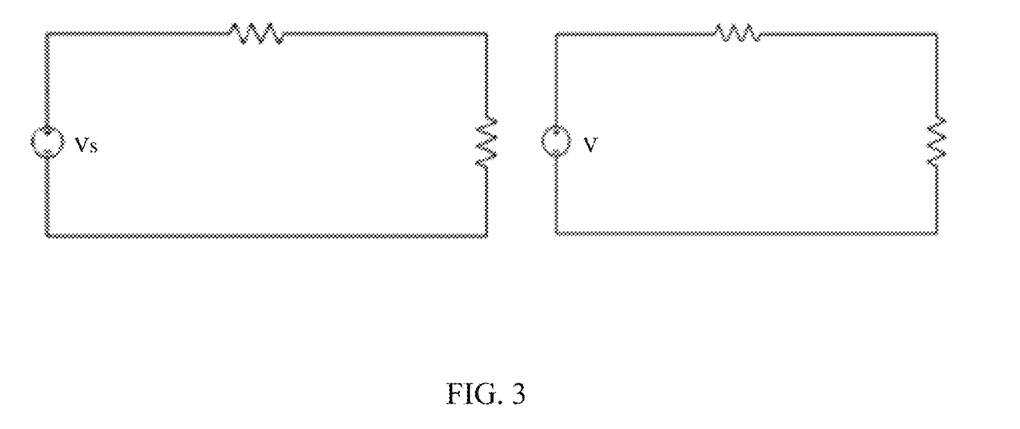
FIG. 3 is an equivalent circuit diagram of a wireless charging system.

It should be noted that wireless charging of the terminal device may be implemented by using a wireless charging system. FIG. 3 shows an equivalent circuit diagram of the wireless charging system. A circuit on the left in FIG. 3 is a basic equivalent circuit at a transmit end, and the basic equivalent circuit at the transmit end includes a wireless charging transmit coil (which may be referred to as a transmit end coil for short); and a circuit on the right in FIG. 3 is a basic equivalent circuit at a receive end, and the basic equivalent circuit at the receive end includes the foregoing wireless charging receive coil (which may be referred to as a receive end coil for short). The circuits on the left and right in FIG. 3 meet the following formula:

$$V = jwM \times Vs \times Y11.$$

V is the induced voltage of the wireless charging receive coil (which may also be referred to as an equivalent voltage of the transmit end at the receive end); j is an imaginary number; w is an angular frequency; M is a mutual inductance between the wireless charging transmit coil and the wireless charging receive coil; Vs is an input voltage of the wireless charging transmit coil; and Y11 is a sum of impedances of a capacitance, an inductance, and a resistance of the circuit at the transmit end.

It can be easily learned that V is proportional to M. The larger M, the larger V.

Generally, M may be calculated by using the following Norman formula:

$$M = \frac{u_0 \times N_1 \times N_2}{4\pi} \times \oint \oint \frac{\overrightarrow{dl1} \times \overrightarrow{dl2}}{d}.$$

In the formula, $u_0$ is a magnetic conductivity, $N_1$ is a quantity of turns of the wireless charging transmit coil, $N_2$ is a quantity of turns of the wireless charging receive coil (the quantity of turns may be a quantity of coil turns in the wireless charging control circuit), dl1 is a line element of the wireless charging transmit coil, dl2 is a line element of the wireless charging receive coil, and d is a distance between the wireless charging transmit coil and the wireless charging receive coil.

It can be easily learned that M is proportional to $N_2$. The larger $N_2$, the larger M.

In addition, M is further related to a relative position of a center of the wireless charging transmit coil and a center of the wireless charging receive coil. For example, the closer the center of the wireless charging transmit coil is to the center of the wireless charging receive coil, the larger M is; and the farther the center of the wireless charging transmit coil is from the center of the wireless charging receive coil, the smaller M is.

Step 202: Control, based on the induced voltage, the wireless charging receive coil to operate in a corresponding operating state.

It should be noted that there are various implementation forms of step 202, and the following provides descriptions by using an example.

In a possible implementation, step 202 includes:
  in a case that the induced voltage is less than a preset voltage, controlling the wireless charging receive coil to operate in a first operating state; and
  in a case that the induced voltage is not less than the preset voltage, controlling the wireless charging receive coil to operate in a second operating state, where
  an inductance value in the first operating state is greater than an inductance value in the second operating state.

Optionally, the preset voltage may be a prestored value, and the preset voltage may be a normal charging voltage of the wireless charging receive coil.

The foregoing implementation form is described in detail by using a example.

It is assumed that the wireless charging receive coil has only two operating states: the first operating state and the second operating state. A quantity of coil turns for the wireless charging receive coil to access the wireless charging control circuit in the first operating state is greater than a quantity of coil turns for the wireless charging receive coil to access the wireless charging control circuit in the second operating state. In this way, the inductance value in the first operating state is greater than the inductance value in the second operating state.

Generally, if the quantity of coil turns for the wireless charging receive to access the wireless charging control circuit is larger, an impedance of the wireless charging receiving coil is greater. Therefore, when wireless charging is performed, an energy loss caused by the wireless charging receive coil is greater, and correspondingly, charging efficiency of the terminal device is lower, and wireless charging power of the terminal device is also higher. It can be learned that, in comparison with a case that the wireless charging receive coil operates in the first operating state, charging efficiency of the terminal device is higher when the wireless charging receive coil operates in the second operating state.

In addition, it can be learned from the foregoing two formulas that, for the wireless charging receive coil, if a same induced voltage needs to be generated in positions at different distances from the wireless charging transmit coil, an inductance value of the wireless charging receive coil at a position far from the wireless charging transmit coil needs to be greater than an inductance value at a position close to the wireless charging transmit coil. On the contrary, if an inductance value of the wireless charging receive coil is larger, a charging degree of freedom of the terminal device is higher; and if the inductance value of the wireless charging receive coil is smaller, the charging degree of freedom of the terminal device is lower. It can be learned that, in comparison with a case that the wireless charging receive coil operates in the second operating state, the charging degree of freedom of the terminal device is higher when the wireless charging receive coil operates in the first operating state.

In this embodiment, when the wireless charging system in FIG. 3 starts to perform wireless charging, the wireless charging receiving coil may operate in the first operating state by default. Then the wireless charging control circuit may obtain the induced voltage of the wireless charging receive coil, and compare the obtained induced voltage with the preset voltage.

If the obtained induced voltage is not less than the preset voltage, it indicates that the terminal device can be charged normally at present. In this case, the wireless charging control circuit may switch the wireless charging receive coil from the first operating state to the second operating state, and control the wireless charging receive coil to operate in the second operating state. In this way, in this embodiment, charging efficiency of the terminal device can be ensured when normal charging of the terminal device is ensured as far as possible.

If the obtained induced voltage is less than the preset voltage, when the wireless charging receive coil is switched from the first operating state to the second operating state, because the quantity of coil turns for the wireless charging receive coil to access the wireless charging control circuit is reduced, the induced voltage of the wireless charging receive coil is reduced, and a difference between the induced voltage of the wireless charging receive coil and the preset voltage is further increased. This is not conducive to normal charging of the terminal device. Therefore, in this case, the wireless charging receive coil can still operate in the first operating state, so that the charging degree of freedom of the terminal device can be ensured when normal charging of the terminal device is ensured as much as possible.

It can be learned that, in this implementation form, the charging efficiency and the charging degree of freedom of the terminal device can be considered when normal charging of the terminal device is ensured as far as possible, to ensure wireless charging performance of the terminal device from a perspective of the charging efficiency and the charging degree of freedom.

It should be noted that the implementation form of step 202 is not limited thereto. In another implementation form, when the wireless charging receive coil is controlled, based on the induced voltage, to operate in the corresponding operating state, the wireless charging control circuit can improve wireless charging performance of the terminal device from a perspective other than the charging efficiency and the charging degree of freedom.

In this embodiment of the present disclosure, a wireless charging receive coil in a wireless charging control circuit may have at least two operating states, and inductance values of the wireless charging receive coil in the operating states are different from each other. In this way, the wireless charging control circuit can control, based on the induced voltage of the wireless charging receive coil, the wireless charging receive coil to operate in a corresponding operating state. It can be learned that, in the embodiments of the present disclosure, a charging state of a terminal device is not fixed, and the charging state of the terminal device may be flexibly adjusted based on the induced voltage of the wireless charging receive coil, to ensure wireless charging performance of the terminal device (for example, to ensure charging efficiency, a charging degree of freedom, and the like), thereby better meeting a user requirement and achieving good user charging experience.

Optionally, the wireless charging control circuit further includes a rectifier, the rectifier includes M rectifier arms, and M is an integer greater than or equal to 3; and the wireless charging receive coil has M lead terminals, and the M lead terminals are electrically connected to the M rectifier arms in one-to-one correspondence, where any two lead terminals form one terminal group, each terminal group corresponds to one inductance value, and inductance values corresponding to at least two terminal groups are different from each other; and the controlling, based on the induced voltage, the wireless charging receive coil to operate in a corresponding operating state includes:

setting, based on the induced voltage, two rectifier arms that are electrically connected to two lead terminals in a corresponding terminal group to a conducting state, and setting a remaining rectifier arm to a non-conducting state.

M may be 3, 4, 5, or others integer greater than 5, which are not listed one by one herein.

Figure 4:
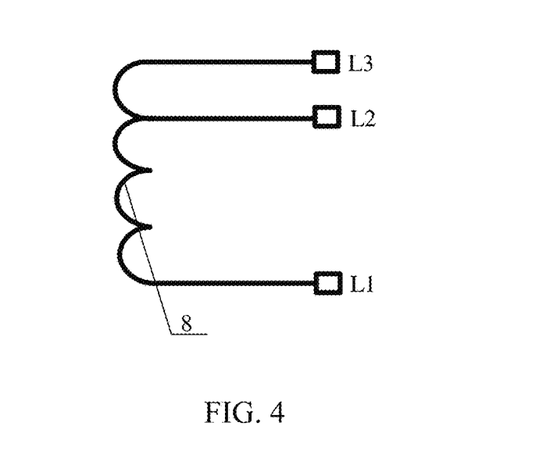
FIG. 4 is a schematic structural diagram of a wireless charging receive coil.

As shown in FIG. 1 and FIG. 4, the wireless charging receive coil 8 may be a tap coil, and may have three lead terminals (M is 3): a lead terminal L1, a lead terminal L2, and a lead terminal L3. The lead terminal L1 and the lead terminal L2 form one terminal group, and an inductance value corresponding to the terminal group is an inductance value (assumed as an inductance value in the second operating state) of a coil (which may be considered as a small inductance coil) between the lead terminal L1 and the lead terminal L2 in the wireless charging receive coil 8. The lead terminal L1 and the lead terminal L3 form another terminal group, and an inductance value corresponding to the terminal group is an inductance value (assumed as an inductance value in the first operating state) of a coil (which may be considered as a large inductance coil) between the lead terminal L1 and the lead terminal L3 in the wireless charging receive coil 8.

As shown in FIG. 1, the rectifier in the wireless charging control circuit may include three rectifier arms: a first rectifier arm 11, a second rectifier arm 12, and a third rectifier arm 13. The first rectifier arm 11 is electrically connected to the lead terminal L1, the second rectifier arm 12 is electrically connected to the lead terminal L2, and the third rectifier arm 13 is electrically connected to the lead terminal L3.

In this embodiment, the control module 10 may obtain the induced voltage of the wireless charging receive coil, and compare the obtained induced voltage with the preset voltage.

If the induced voltage is not less than the preset voltage, the control module 10 may set the first rectifier arm 11 electrically connected to the lead terminal L1 and the second rectifier arm 12 electrically connected to the lead terminal L2 to a conducting state, and set the third rectifier arm 13 to a non-conducting state. In this case, the wireless charging receive coil 8 may operate in the second operating state.

If the induced voltage is less than the preset voltage, the control module 10 may set the first rectifier arm 11 electrically connected to the lead terminal L1 and the third rectifier arm 13 electrically connected to the lead terminal L3 to a conducting state, and set the second rectifier arm 12 to a non-conducting state. In this case, the wireless charging receive coil 8 may operate in the first operating state.

It can be learned that by controlling whether each rectifier arm is conductive, an operating state of the wireless charging receive coil can be conveniently controlled in this embodiment.

Optionally, an output port and M input ports are disposed in the rectifier;

each rectifier arm includes a first switching transistor and a second switching transistor, and the output port is grounded by using the first switching transistor and the second switching transistor in sequence; and the M lead terminals are electrically connected to M common terminals by using the M input ports, and each common terminal is a common terminal of the first switching transistor and the second switching transistor in the rectifier arm; and the setting, based on the induced voltage, two rectifier arms that are electrically connected to two lead terminals in a corresponding terminal group to a conducting state, and setting a remaining rectifier arm to a non-conducting state includes:

setting, based on the induced voltage, the first switching transistor and the second switching transistor in the two rectifier arms that are electrically connected to the two lead terminals in the corresponding terminal group to a conducting state, and setting each switching transistor in the remaining rectifier arm to a cut-off state.

The first switching transistor and the second switching transistor in each rectifier arm may be MOSs. It can be understood that the MOS is an abbreviation of MOSFET, and the MOSFET is a metal-oxide semiconductor field-effect transistor.

As shown in FIG. 1, an output port VRECT and three input ports are disposed in the rectifier, and the three input ports are an input port AC1, an input port AC2, and an input port AC3.

In addition, the first switching transistor in the first rectifier arm 11 is Q1, and the second switching transistor in the first rectifier arm 11 is Q2. A first electrode of Q1 is electrically connected to the output port VRECT, a second electrode of Q1 is electrically connected to the control module 10, a third electrode of Q1 is electrically connected to a first electrode of Q2, a second electrode of Q2 is electrically connected to the control module 10, a third electrode of Q2 is grounded, and the lead terminal L1 is electrically connected to the third electrode of Q1 and the first electrode of Q2 by using the input port AC1.

Similarly, the first switching transistor in the second rectifier arm 12 is Q3, and the second switching transistor in the second rectifier arm 12 is Q4. A first electrode of Q3 is electrically connected to the output port VRECT, a second electrode of Q3 is electrically connected to the control module 10, a third electrode of Q3 is electrically connected to a first electrode of Q4, a second electrode of Q4 is electrically connected to the control module 10, a third electrode of Q4 is grounded, and the lead terminal L2 is electrically connected to the third electrode of Q3 and the first electrode of Q4 by using the input port AC2.

Similarly, the first switching transistor in the third rectifier arm 13 is Q5, and the second switching transistor in the third rectifier arm 13 is Q6. A first electrode of Q5 is electrically connected to the output port VRECT, a second electrode of Q5 is electrically connected to the control module 10, a third electrode of Q5 is electrically connected to a first electrode of Q6, a second electrode of Q6 is electrically connected to the control module 10, a third electrode of Q6 is grounded, and the lead terminal L3 is electrically connected to the third electrode of Q5 and the first electrode of Q6 by using the input port AC3.

It should be noted that the wireless charging control circuit generally further includes a voltage divider resistor 14.

In this embodiment, when the wireless charging system in FIG. 2 starts to perform wireless charging, the control module 10 may set Q1, Q2, Q5, and Q6 to a conducting state, and set Q3 and Q4 to a cut-off state, so that the wireless charging receive coil operates in the first operating state by default.

Then the control module 10 may obtain the induced voltage of the wireless charging receive coil, and compare the obtained induced voltage with the preset voltage.

If the induced voltage is not less than the preset voltage, the control module 10 may maintain a conducting state of Q1 and Q2, and switch Q5 and Q6 from a conducting state to a cut-off state and switch Q3 and Q4 from a cut-off state to a conducting state without interruption of wireless charging, so as to implement switching of the working rectifier arm, thereby switching the wireless charging receive coil from the first operating state to the second operating state.

It can be learned that by controlling a state of each switching transistor in each rectifier arm, an operating state of the wireless charging receive coil can be conveniently controlled in this embodiment.

It should be emphasized that a manner of controlling the operating state of the wireless charging receive coil is not limited to the foregoing manner. For example, in FIG. 1, a first control switch may be disposed on a connection line between the input port AC1 and the third electrode of Q1 and the first electrode of Q2, a second control switch may be disposed on a connection line between the input port AC2 and the third electrode of Q3 and the first electrode of Q4, and a third control switch may be disposed on a connection line between the input port AC3 and the third electrode of Q5 and the first electrode of Q6. The control module 10 may control an on/off state of the first control switch, the second control switch, and the third control switch, to control the operating state of the wireless charging receive coil.

In view of the above, in this embodiment, a charging state of the terminal device is not fixed, and the charging state of the terminal device may be flexibly adjusted based on the induced voltage of the wireless charging receive coil, to ensure wireless charging performance of the terminal device, thereby better meeting a user requirement and achieving good user charging experience.

The following describes a wireless charging control circuit provided in the embodiments of the present disclosure.

FIG. 1 is a schematic structural diagram of a wireless charging control circuit according to an embodiment of the present disclosure. As shown in FIG. 1, the wireless charging control circuit is applied to a terminal device, and the wireless charging control circuit includes:

a wireless charging receive coil 8, where the wireless charging receive coil 8 has at least two operating states, and inductance values of the wireless charging receive coil 8 in the operating states are different from each other; and a control module 10, where the control module 10 is electrically connected to the wireless charging receive coil 8, the control module 10 obtains an induced voltage of the wireless charging receive coil 8, and controls, based on the induced voltage, the wireless charging receive coil 8 to operate in a corresponding operating state.

Optionally, in a case that the induced voltage is less than a preset voltage, the control module 10 controls the wireless charging receive coil 8 to operate in a first operating state; and in a case that the induced voltage is not less than the preset voltage, the control module 10 controls the wireless charging receive coil 8 to operate in a second operating state, where an inductance value in the first operating state is greater than an inductance value in the second operating state.

Optionally, the wireless charging control circuit further includes:

a rectifier, where the rectifier includes M rectifier arms, and M is an integer greater than or equal to 3;

the wireless charging receive coil 8 has M lead terminals, and the M lead terminals are electrically connected to the M rectifier arms in one-to-one correspondence, where any two lead terminals form one terminal group, each terminal group corresponds to one inductance value, and inductance values corresponding to at least two terminal groups are different from each other; and the control module 10 sets, based on the induced voltage, two rectifier arms that are electrically connected to two lead terminals in a corresponding terminal group to a conducting state, and sets a remaining rectifier arm to a non-conducting state.

Optionally, an output port VRECT and M input ports are disposed in the rectifier;

each rectifier arm includes a first switching transistor and a second switching transistor, the output port VRECT is grounded by using the first switching transistor and the second switching transistor in sequence, and the first switching transistor and the second switching transistor are further electrically connected to the control module 10 respectively; and the M lead terminals are electrically connected to M common terminals by using the M input ports, and each common terminal is a common terminal of the first switching transistor and the second switching transistor in the rectifier arm; and the control module 10 sets, based on the induced voltage, the first switching transistor and the second switching transistor in the two rectifier arms that are electrically connected to the two lead terminals in the corresponding terminal group to a conducting state, and sets each switching transistor in the remaining rectifier arm to a cut-off state.

In this embodiment of the present disclosure, a wireless charging receive coil 8 in a wireless charging control circuit may have at least two operating states, and inductance values of the wireless charging receive coil 8 in the operating states are different from each other. In this way, a control module 10 in the wireless charging control circuit can control, based on the induced voltage of the wireless charging receive coil 8, the wireless charging receive coil 8 to operate in a corresponding operating state. It can be learned that, in the embodiments of the present disclosure, a charging state of a terminal device is not fixed, and the charging state of the terminal device may be flexibly adjusted based on the induced voltage of the wireless charging receive coil 8, to ensure wireless charging performance of the terminal device (for example, to ensure charging efficiency, a charging degree of freedom, and the like), thereby better meeting a user requirement and achieving good user charging experience.

The following describes a terminal device provided in the embodiments of the present disclosure.

An embodiment of the present disclosure provides a terminal device, and the terminal device includes the foregoing wireless charging control circuit. For a implementation process of the wireless charging control circuit, refer to the foregoing descriptions. This is not limited in this embodiment of the present disclosure.

Because the wireless charging control circuit has the foregoing technical effect, the terminal device that includes the wireless charging control circuit also has the corresponding technical effect. Details are not described herein again.

Figure 5:
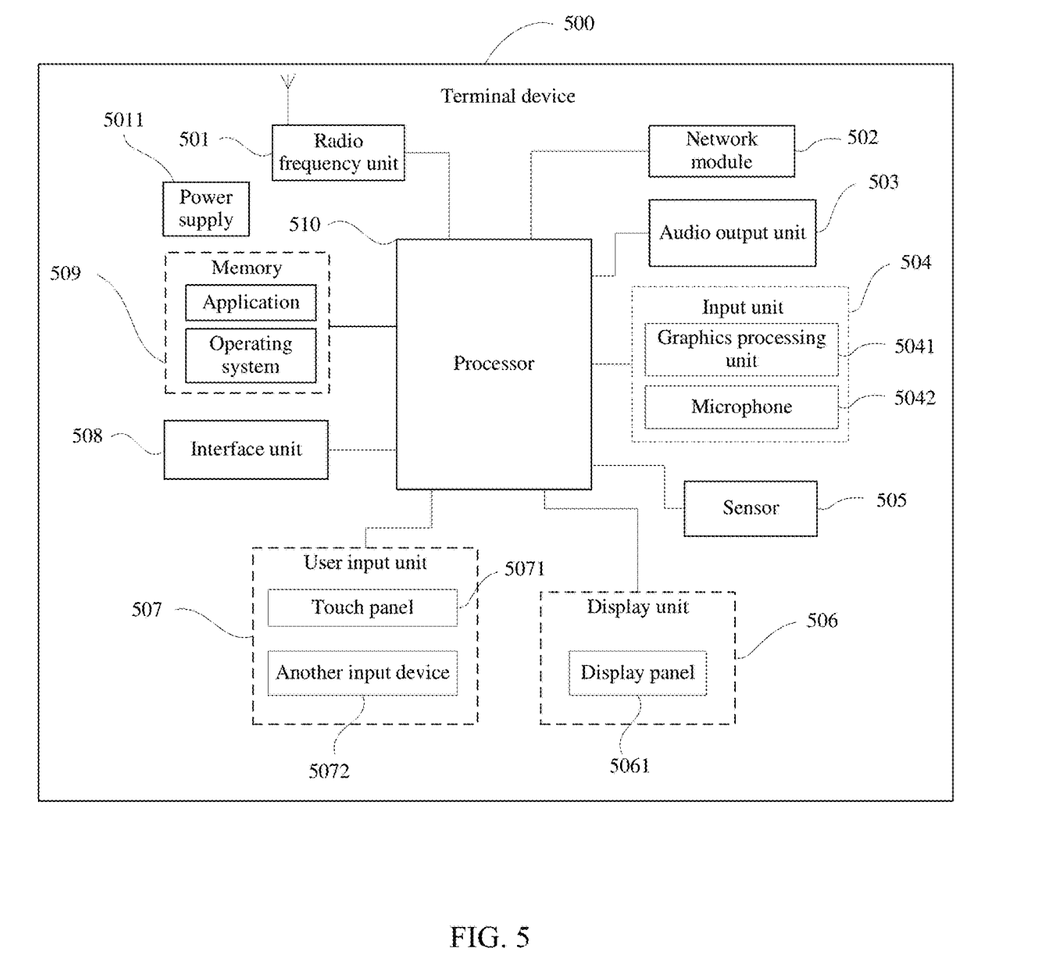
FIG. 5 is a schematic diagram of a hardware structure of a terminal device according to an embodiment of the present disclosure.

FIG. 5 shows a schematic structural diagram of hardware of a terminal device 500 that implements the embodiments of the present disclosure. As shown in FIG. 5, the terminal device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. It can be understood by a person skilled in the art that, the terminal device structure shown in FIG. 5 does not constitute any limitation on the terminal device, and the terminal device 500 may include more or fewer components than those shown in the figure, or combine some components, or have different component arrangements. It should be noted that the terminal device 500 includes a wireless charging control circuit, the wireless charging control circuit includes a wireless charging receive coil, the wireless charging receive coil has at least two operating states, and inductance values of the wireless charging receive coil in the operating states are different from each other; and the processor 510 is configured to:

obtain an induced voltage of the wireless charging receive coil; and control, based on the induced voltage, the wireless charging receive coil to operate in a corresponding operating state.

In this embodiment of the present disclosure, a wireless charging receive coil in a wireless charging control circuit may have at least two operating states, and inductance values of the wireless charging receive coil in the operating states are different from each other. In this way, the wireless charging control circuit can control, based on the induced voltage of the wireless charging receive coil, the wireless charging receive coil to operate in a corresponding operating state. It can be learned that, in this embodiment of the present disclosure, a charging state of the terminal device 500 is not fixed, and the charging state of the terminal device 500 may be flexibly adjusted based on the induced voltage of the wireless charging receive coil, to ensure wireless charging performance of the terminal device 500 (for example, to ensure charging efficiency, a charging degree of freedom, and the like), thereby better meeting a user requirement and achieving good user charging experience.

Optionally, the processor 510 may be configured to:

in a case that the induced voltage is less than a preset voltage, control the wireless charging receive coil to operate in a first operating state; and in a case that the induced voltage is not less than the preset voltage, control the wireless charging receive coil to operate in a second operating state, where an inductance value in the first operating state is greater than an inductance value in the second operating state.

Optionally, the wireless charging control circuit further includes a rectifier, the rectifier includes M rectifier arms, and M is an integer greater than or equal to 3; and the wireless charging receive coil has M lead terminals, and the M lead terminals are electrically connected to the M rectifier arms in one-to-one correspondence, where any two lead terminals form one terminal group, each terminal group corresponds to one inductance value, and inductance values corresponding to at least two terminal groups are different from each other; and the processor 510 may be configured to:

set, based on the induced voltage, two rectifier arms that are electrically connected to two lead terminals in a corresponding terminal group to a conducting state, and set a remaining rectifier arm to a non-conducting state.

Optionally, an output port and M input ports are disposed in the rectifier;

each rectifier arm includes a first switching transistor and a second switching transistor, and the output port is grounded by using the first switching transistor and the second switching transistor in sequence; and the M lead terminals are electrically connected to M common terminals by using the M input ports, and each common terminal is a common terminal of the first switching transistor and the second switching transistor in the rectifier arm; and the processor 510 may be configured to:

set, based on the induced voltage, the first switching transistor and the second switching transistor in the two rectifier arms that are electrically connected to the two lead terminals in the corresponding terminal group to a conducting state, and set each switching transistor in the remaining rectifier arm to a cut-off state.

It should be understood that, in this embodiment of the present disclosure, the radio frequency unit 501 may be configured to receive and send information or a signal in a call process. After receiving downlink data from a base station, the radio frequency unit 501 sends the downlink data to the processor 510 for processing. In addition, the radio frequency unit 501 sends uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may communicate with a network and another device through a wireless communication system.

The terminal provides wireless broadband Internet access for the user by using the network module 502, for example, helping the user send and receive an e-mail, browse a web page, and access streaming media.

The audio output unit 503 may convert audio data received by the radio frequency unit 501 or the network module 502 or stored in the memory 509 into an audio signal and output the audio signal as a sound. In addition, the audio output unit 503 may further provide an audio output (for example, a call signal received voice, or a message received voice) related to a specific function implemented by the terminal device 500. The audio output unit 503 includes a speaker, a buzzer, a telephone receiver, and the like.

The input unit 504 is configured to receive an audio signal or a video signal. The input unit 504 may include a graphics processing unit (GPU) 5041 and a microphone 5042, and the graphics processing unit 5041 processes image data of a still picture or video obtained by an image capture apparatus (such as a camera) in a video capture mode or an image capture mode. A processed image frame may be displayed on the display unit 506. The image frame processed by the graphics processor 5041 may be stored in the memory 509 (or another storage medium) or sent by using the radio frequency unit 501 or the network module 502. The microphone 5042 may receive sound and can process such sound into audio data. The processed audio data may be converted, in a call mode, into a format that can be sent to a mobile communication base station by using the radio frequency unit 501 for output.

The terminal device 500 further includes at least one sensor 505, such as an optical sensor, a motion sensor, and other sensors. The optical sensor includes an ambient light sensor and a proximity sensor. The ambient light sensor may adjust luminance of the display panel 5061 based on brightness of ambient light. The proximity sensor may turn off the display panel 5061 and/or backlight when the terminal device 500 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by a user or information provided for a user. The display unit 506 may include a display panel 5061. The display panel 5061 may be configured in a form of a liquid crystal display (LCD), an organic light-emitting diode (OLED), or the like.

The user input unit 507 may be configured to receive input numeral or character information, and generate key signal input related to user setting and functional control of the terminal. The user input unit 507 includes a touch panel 5071 and another input device 5072. The touch panel 5071 is also referred to as a touchscreen, and may collect a touch operation performed by a user on or near the touch panel 5071 (such as an operation performed by a user on the touch panel 5071 or near the touch panel 5071 by using any proper object or accessory, such as a finger or a stylus). The touch panel 5071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 5071 may be of a resistive type, a capacitive type, an infrared type, a surface acoustic wave type, or the like. The user input unit 507 may include another input device 5072 in addition to the touch panel 5071. Another input device 5072 may include but is not limited to a physical keyboard, function keys (such as a volume control key and a switch key), a trackball, a mouse, and a joystick. Details are not described herein.

Further, the touch panel 5071 may cover the display panel 5061. When detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. Although in FIG. 5, the touch panel 5071 and the display panel 5061 are used as two independent components to implement input and output functions of the terminal, in some embodiments, the touch panel 5071 and the display panel 5061 may be integrated to implement the input and output functions of the mobile terminal. This is not specifically limited herein.

The interface unit 508 is an interface for connecting an external apparatus to the terminal device 500. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 508 may be configured to receive input (for example, data information and power) from an external apparatus and transmit the received input to one or more elements in the terminal device 500 or may be configured to transmit data between the terminal device 500 and an external apparatus.

The memory 509 may be configured to store a software program and various data. The memory 509 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 509 may include a high-speed random access memory or a nonvolatile memory, for example, at least one disk storage device, a flash memory, or another volatile solid-state storage device.

The processor 510 is a control center of the terminal device 500, and connects all the components of the entire terminal by using various interfaces and lines. By running or executing a software program and/or a module that are stored in the memory 509 and by invoking data stored in the memory 509, the processor 510 performs various functions of the terminal device 500 and data processing, to perform overall monitoring on the terminal device 500. The processor 510 may include one or more processing units. Optionally, an application processor and a modem processor may be integrated into the processor 510.

The application processor mainly processes an operating system, a user interface, an application, and the like, and the modem processor mainly processes wireless communication. It can be understood that, alternatively, the modem processor may not be integrated into the processor 510.

The terminal device 500 may further include the power supply 511 (such as a battery) that supplies power to each component. Optionally, the power supply 511 may be logically connected to the processor 510 by using a power supply management system, so as to implement functions such as charging and discharging management, and power consumption management by using the power supply management system.

In addition, the terminal device 500 includes some function modules not shown, and details are not described herein.

Optionally, an embodiment of the present disclosure further provides a terminal device, including a processor 510, a memory 509, and a computer program that is stored in the memory 509 and executable on the processor 510. When the processor 510 executes the computer program, the foregoing processes of the wireless charging control method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when a processor executes the computer program, the foregoing processes of the wireless charging control method embodiment are implemented and a same technical effect can be achieved. To avoid repetition, details are not described herein again. The non-transitory computer-readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A wireless charging control method, applied to a wireless charging control circuit in a terminal device, wherein the wireless charging control circuit comprises a wireless charging receive coil, the wireless charging receive coil has at least two operating states, and inductance values of the wireless charging receive coil in the operating states are different from each other; and the wireless charging control method comprises:
obtaining an induced voltage of the wireless charging receive coil; and
controlling, based on the induced voltage, the wireless charging receive coil to operate in a corresponding operating state; wherein
the wireless charging control circuit further comprises a rectifier, the rectifier comprises M rectifier arms, and M is an integer greater than or equal to 3; and the wireless charging receive coil has M lead terminals, and the M lead terminals are electrically connected to the M rectifier arms in one-to-one correspondence, wherein any two lead terminals form one terminal group, each terminal group corresponds to one inductance value, and inductance values corresponding to at least two terminal groups are different from each other; and the controlling, based on the induced voltage, the wireless charging receive coil to operate in the corresponding operating state comprises:

setting, based on the induced voltage, two rectifier arms that are electrically connected to two lead terminals in a corresponding terminal group to a conducting state, and setting a remaining rectifier arm to a non-conducting state; wherein an output port and M input ports are disposed in the rectifier; and each rectifier arm comprises a first switching transistor and a second switching transistor, and the output port is grounded by using the first switching transistor and the second switching transistor in sequence, the M lead terminals are electrically connected to M common terminals by using the M input ports, and each common terminal is a common terminal of the first switching transistor and the second switching transistor in the rectifier arm.

2. The method according to claim 1, wherein the controlling, based on the induced voltage, the wireless charging receive coil to operate in the corresponding operating state comprises:

in a case that the induced voltage is less than a preset voltage, controlling the wireless charging receive coil to operate in a first operating state; and in a case that the induced voltage is not less than the preset voltage, controlling the wireless charging receive coil to operate in a second operating state, wherein an inductance value in the first operating state is greater than an inductance value in the second operating state.

3. The method according to claim 1, wherein the setting, based on the induced voltage, two rectifier arms that are electrically connected to two lead terminals in the corresponding terminal group to the conducting state, and setting the remaining rectifier arm to the non-conducting state comprises:

setting, based on the induced voltage, the first switching transistor and the second switching transistor in the two rectifier arms that are electrically connected to the two lead terminals in the corresponding terminal group to the conducting state, and setting each switching transistor in the remaining rectifier arm to a cut-off state.

4. A wireless charging control circuit, wherein the wireless charging control circuit comprises:

a wireless charging receive coil, wherein the wireless charging receive coil has at least two operating states, and inductance values of the wireless charging receive coil in the operating states are different from each other; and a control module, wherein the control module is electrically connected to the wireless charging receive coil, and the control module obtains an induced voltage of the wireless charging receive coil, and controls, based on the induced voltage, the wireless charging receive coil to operate in a corresponding operating state; wherein the wireless charging control circuit further comprises a rectifier, the rectifier comprises M rectifier arms, and M is an integer greater than or equal to 3;

the wireless charging receive coil has M lead terminals, and the M lead terminals are electrically connected to the M rectifier arms in one-to-one correspondence, wherein any two lead terminals form one terminal group, each terminal group corresponds to one inductance value, and inductance values corresponding to at least two terminal groups are different from each other; and the control module sets, based on the induced voltage, two rectifier arms that are electrically connected to two lead terminals in a corresponding terminal group to a conducting state, and sets a remaining rectifier arm to a non-conducting state; wherein an output port and M input ports are disposed in the rectifier; and each rectifier arm comprises a first switching transistor and a second switching transistor, the output port is grounded by using the first switching transistor and the second switching transistor in sequence, and the first switching transistor and the second switching transistor are further electrically connected to the control module respectively, the M lead terminals are electrically connected to M common terminals by using the M input ports, and each common terminal is a common terminal of the first switching transistor and the second switching transistor in the rectifier arm.

5. The circuit according to claim 4, wherein in a case that the induced voltage is less than a preset voltage, the control module controls the wireless charging receive coil to operate in a first operating state; and in a case that the induced voltage is not less than the preset voltage, the control module controls the wireless charging receive coil to operate in a second operating state, wherein an inductance value in the first operating state is greater than an inductance value in the second operating state.

6. The circuit according to claim 4, wherein the control module sets, based on the induced voltage, the first switching transistor and the second switching transistor in the two rectifier arms that are electrically connected to the two lead terminals in the corresponding terminal group to the conducting state, and sets each switching transistor in the remaining rectifier arm to a cut-off state.

7. A terminal device, comprising a processor, a memory, and a computer program that is stored in the memory and executable on the processor, wherein the computer program, when executed by the processor, causes the processor to perform:

obtaining an induced voltage of a wireless charging receive coil; and controlling, based on the induced voltage, the wireless charging receive coil to operate in a corresponding operating state;

wherein the terminal device comprises a wireless charging control circuit, the wireless charging control circuit comprises the wireless charging receive coil, the wireless charging receive coil has at least two operating states, and inductance values of the wireless charging receive coil in the operating states are different from each other; wherein the wireless charging control circuit further comprises a rectifier, the rectifier comprises M rectifier arms, and M is an integer greater than or equal to 3; and the wireless charging receive coil has M lead terminals, and the M lead terminals are electrically connected to the M rectifier arms in one-to-one correspondence, wherein any two lead terminals form one terminal group, each terminal group corresponds to one inductance value, and inductance values corresponding to at least two terminal groups are different from each other; and when the processor executes the computer program, when executed by the processor, causes the processor to perform:
setting, based on the induced voltage, two rectifier arms that are electrically connected to two lead terminals in a corresponding terminal group to a conducting state, and setting a remaining rectifier arm to a non-conducting state; wherein
an output port and M input ports are disposed in the rectifier; and
each rectifier arm comprises a first switching transistor and a second switching transistor, and the output port is grounded by using the first switching transistor and the second switching transistor in sequence, the M lead terminals are electrically connected to M common terminals by using the M input ports, and each common terminal is a common terminal of the first switching transistor and the second switching transistor in the rectifier arm.

8. The terminal device according to claim 7, wherein when the processor executes the computer program, when executed by the processor, causes the processor to perform:
in a case that the induced voltage is less than a preset voltage, controlling the wireless charging receive coil to operate in a first operating state; and
in a case that the induced voltage is not less than the preset voltage, controlling the wireless charging receive coil to operate in a second operating state, wherein
an inductance value in the first operating state is greater than an inductance value in the second operating state.

9. The terminal device according to claim 7, wherein the computer program, when executed by the processor, causes the processor to perform:
setting, based on the induced voltage, the first switching transistor and the second switching transistor in the two rectifier arms that are electrically connected to the two lead terminals in the corresponding terminal group to the conducting state, and setting each switching transistor in the remaining rectifier arm to a cut-off state.

10. A terminal device, comprising a wireless charging control circuit, wherein the wireless charging control circuit comprises:
a wireless charging receive coil, wherein the wireless charging receive coil has at least two operating states, and inductance values of the wireless charging receive coil in the operating states are different from each other; and
a control module, wherein the control module is electrically connected to the wireless charging receive coil, and the control module obtains an induced voltage of the wireless charging receive coil, and controls, based on the induced voltage, the wireless charging receive coil to operate in a corresponding operating state; wherein
the wireless charging control circuit further comprises a rectifier, the rectifier comprises M rectifier arms, and M is an integer greater than or equal to 3;
the wireless charging receive coil has M lead terminals, and the M lead terminals are electrically connected to the M rectifier arms in one-to-one correspondence, wherein any two lead terminals form one terminal group, each terminal group corresponds to one inductance value, and inductance values corresponding to at least two terminal groups are different from each other; and
the control module sets, based on the induced voltage, two rectifier arms that are electrically connected to two lead terminals in a corresponding terminal group to a conducting state, and sets a remaining rectifier arm to a non-conducting state; wherein
an output port and M input ports are disposed in the rectifier; and
each rectifier arm comprises a first switching transistor and a second switching transistor, the output port is grounded by using the first switching transistor and the second switching transistor in sequence, and the first switching transistor and the second switching transistor are further electrically connected to the control module respectively, the M lead terminals are electrically connected to M common terminals by using the M input ports, and each common terminal is a common terminal of the first switching transistor and the second switching transistor in the rectifier arm.

11. The terminal device according to claim 10, wherein
in a case that the induced voltage is less than a preset voltage, the control module controls the wireless charging receive coil to operate in a first operating state; and
in a case that the induced voltage is not less than the preset voltage, the control module controls the wireless charging receive coil to operate in a second operating state, wherein
an inductance value in the first operating state is greater than an inductance value in the second operating state.

12. The terminal device according to claim 10, wherein
the control module sets, based on the induced voltage, the first switching transistor and the second switching transistor in the two rectifier arms that are electrically connected to the two lead terminals in the corresponding terminal group to the conducting state, and sets each switching transistor in the remaining rectifier arm to a cut-off state.

13. A non-transitory computer-readable storage medium, wherein the non-transitory computer-readable storage medium stores a computer program, and when a processor of a terminal device executes the computer program, causes the terminal device to perform:
obtaining an induced voltage of the wireless charging receive coil; and
controlling, based on the induced voltage, the wireless charging receive coil to operate in a corresponding operating state;
the terminal device comprises a wireless charging control circuit, and the wireless charging control circuit comprises a wireless charging receive coil, the wireless charging receive coil has at least two operating states, and inductance values of the wireless charging receive coil in the operating states are different from each other; wherein
the wireless charging control circuit further comprises a rectifier, the rectifier comprises M rectifier arms, and M is an integer greater than or equal to 3; and the wireless charging receive coil has M lead terminals, and the M lead terminals are electrically connected to the M rectifier arms in one-to-one correspondence, wherein any two lead terminals form one terminal group, each terminal group corresponds to one inductance value, and inductance values corresponding to at least two terminal groups are different from each other; and
when the processor executes the computer program, when executed by the processor, causes the processor to perform:
setting, based on the induced voltage, two rectifier arms that are electrically connected to two lead terminals in a corresponding terminal group to a conducting state, and setting a remaining rectifier arm to a non-conducting state; wherein an output port and M input ports are disposed in the rectifier;

each rectifier arm comprises a first switching transistor and a second switching transistor, and the output port is grounded by using the first switching transistor and the second switching transistor in sequence; and the M lead terminals are electrically connected to M common terminals by using the M input ports, and each common terminal is a common terminal of the first switching transistor and the second switching transistor in the rectifier arm.

14. The non-transitory computer-readable storage medium according to claim 13, wherein the non-transitory computer-readable storage medium stores a computer program, and when the processor of the terminal device executes the computer program, causes the terminal device to perform:

in a case that the induced voltage is less than a preset voltage, controlling the wireless charging receive coil to operate in a first operating state; and in a case that the induced voltage is not less than the preset voltage, controlling the wireless charging receive coil to operate in a second operating state, wherein an inductance value in the first operating state is greater than an inductance value in the second operating state.

15. The non-transitory computer-readable storage medium according to claim 13, wherein the non-transitory computer-readable storage medium stores a computer program, and when the processor of the terminal device executes the computer program, causes the terminal device to perform:

setting, based on the induced voltage, the first switching transistor and the second switching transistor in the two rectifier arms that are electrically connected to the two lead terminals in the corresponding terminal group to the conducting state, and setting each switching transistor in the remaining rectifier arm to a cut-off state.

* * * * *